US009844066B2

United States Patent
Yu et al.

(10) Patent No.: US 9,844,066 B2
(45) Date of Patent: Dec. 12, 2017

(54) METHOD AND SYSTEM FOR SCHEDULING GROUP RESOURCES DURING TRUNKING COMMUNICATION

(71) Applicant: BEIJING XINWEI TELECOM TECHNOLOGY INC., Beijing (CN)

(72) Inventors: Xixi Yu, Beijing (CN); Qihua Huang, Beijing (CN); Weiyi Cao, Beijing (CN); Qiang Ma, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 378 days.

(21) Appl. No.: 14/648,578

(22) PCT Filed: Jun. 28, 2013

(86) PCT No.: PCT/CN2013/078352
§ 371 (c)(1),
(2) Date: May 29, 2015

(87) PCT Pub. No.: WO2014/082444
PCT Pub. Date: Jun. 5, 2014

(65) Prior Publication Data
US 2015/0312924 A1    Oct. 29, 2015

(30) Foreign Application Priority Data

Nov. 30, 2012  (CN) .......................... 2012 1 0504811

(51) Int. Cl.
*H04W 72/12* (2009.01)
*H04W 72/04* (2009.01)
(Continued)

(52) U.S. Cl.
CPC ..... *H04W 72/121* (2013.01); *H04W 72/0446* (2013.01); *H04W 72/082* (2013.01); *H04W 28/16* (2013.01)

(58) Field of Classification Search
None
See application file for complete search history.

(56) References Cited

U.S. PATENT DOCUMENTS

2009/0239515 A1* 9/2009 Bai .................. H04W 72/005
455/416

FOREIGN PATENT DOCUMENTS

| CN | 201341239 Y | 11/2009 |
|---|---|---|
| CN | 101772167 A | 7/2010 |
| WO | 2009/127105 A1 | 10/2009 |

OTHER PUBLICATIONS

International Search Report in International Application No. PCT/CN2013/078352, dated Sep. 19, 2013.

* cited by examiner

*Primary Examiner* — Ayaz Sheikh
*Assistant Examiner* — Sori Aga
(74) *Attorney, Agent, or Firm* — Baker Hostetler LLP

(57) ABSTRACT

The present disclosure provides a method and system for scheduling group resources during trunking communication. The method includes: classifying base stations connected to a trunking switch center into at least one co frequency base station set and marking a base station that cannot be classified into the at least one co frequency base station set as a different frequency base station according to central frequencies and home regions of the base stations; step when a group call is established, allocating the same trunking shared channel and designating the same packet delivery time to base stations in one co frequency base station set, and notifying each base station in the co frequency base station set of the trunking shared channel and the packet delivery time; and step the base stations in the co frequency base station set starting to send trunking packets on the trunking shared channel at the packet delivery time.

17 Claims, 1 Drawing Sheet

(51) Int. Cl.
*H04W 72/08* (2009.01)
*H04W 28/16* (2009.01)

METHOD AND SYSTEM FOR SCHEDULING GROUP RESOURCES DURING TRUNKING COMMUNICATION

CROSS-REFERENCE TO RELATED APPLICATIONS

This application is a National Stage of International Patent Application No. PCT/CN2013/078352, filed Jun. 28, 2013, which claims priority to Chinese Patent Application No. 201210504811.6, entitled "GROUP RESOURCE SCHEDULING METHOD AND SYSTEM DURING CLUSTER COMMUNICATION" filed on Nov. 30, 2012, the contents of which are incorporated by reference in their entirety.

TECHNICAL FIELD

The present disclosure relates to the trunking communication field, and more particularly to a method and system for scheduling group resources during trunking communication.

BACKGROUND

During trunking communication, when a group call is established, base stations in which members in a group are distributed usually allocate the group call shared channels and power resources required during trunking communication.

During the implementation of the present disclosure, inventors found following problems in the prior art. If members in one group are distributed in a plurality of base stations and some base stations are adjacent co frequency base stations, large co-channel interference between adjacent co frequency base stations in which the members in the group are distributed may be caused because of the omni-directional emission of downlink power during the trunking communication. Accordingly, interference avoidance between adjacent co frequency base stations is required. An effective interference avoidance method refers to channel avoidance between adjacent co frequency base stations. That is, if some channels of base stations in which members in a group are distributed have been allocated as trunking shared channels, channels of adjacent co frequency base stations of these base stations cannot be allocated as trunking shared channels to perform avoidance. If a trunking group is established and base stations in which members in the trunking group are distributed include a plurality of co frequency base stations, channel avoidance is required between adjacent co frequency base stations. However, because channel resources of base stations are limited, it is possible that a certain co frequency base station is unable to allocate a trunking shared channel in order to avoid a shared channel of an adjacent base station. At this time, the establishment of the group call is failure and the group capacity of a trunking system is decreased.

SUMMARY

According to various embodiments, a method and system for scheduling group resources during trunking communication are provided.

A method for scheduling group resources during trunking communication comprises:

classifying base stations connected to a trunking switch center into at least one co frequency base station set and marking a base station that cannot be classified into the at least one co frequency base station set as a different frequency base station according to central frequencies and home regions of the base stations;

when a group call is established, allocating the same trunking shared channel and designating the same packet delivery time to base stations in one co frequency base station set, and notifying each base station in the co frequency base station set of the trunking shared channel and the packet delivery time; and the base stations in the co frequency base station set starting to send trunking packets on the trunking shared channel at the packet delivery time.

A system for scheduling group resources during trunking communication comprises a trunking switch center and base stations connected to the trunking switch center, the trunking switch center is configured to classify the base stations into at least one co frequency base station set and mark a base station that cannot be classified into the at least one co frequency base station set as a different frequency base station according to central frequencies and home regions of the base stations; when a group call is established, to allocate the same trunking shared channel and designate the same packet delivery time to base stations in one co frequency base station set, and notify each base station in the co frequency base station set of the allocated trunking shared channel and the designated packet delivery time; and the base stations in the co frequency base station set are configured to start to send trunking packets on the allocated trunking shared channel at the designated packet delivery time.

By the method and system, when a trunking group is established, it is unnecessary to perform avoidance between adjacent co frequency base stations in which members in the trunking group are distributed to avoid co frequency interference, thereby improving the efficiency of channel resources of trunking system and improving the group capacity of trunking system.

DETAILED DESCRIPTION

In order to make the object, technical solution and merits of the present disclosure clearer, various embodiments will be illustrated hereinafter in detail with reference to the accompanying drawings.

Figure 1:
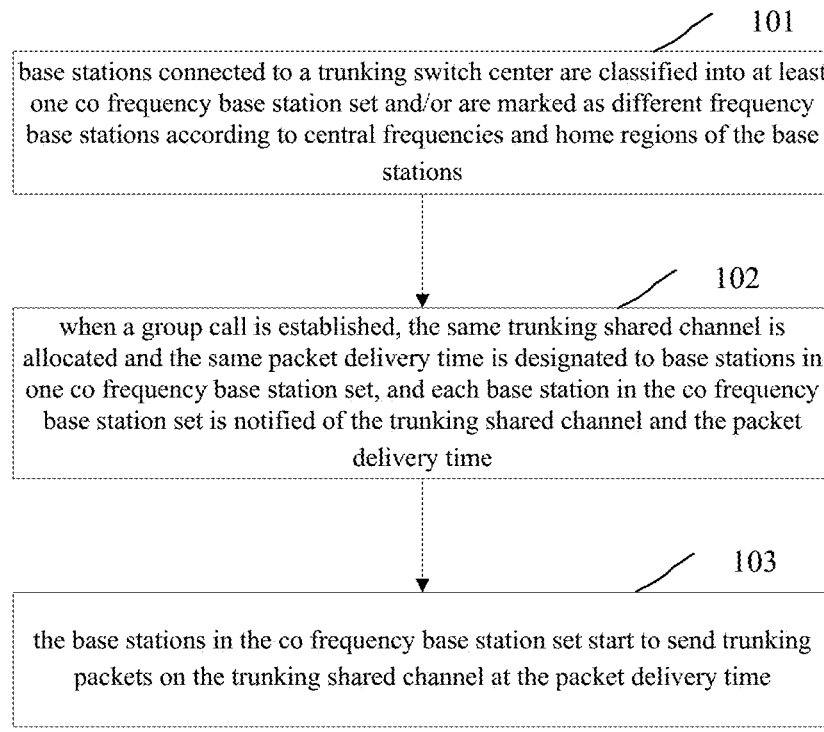
FIG. 1 is a flowchart illustrating a method for scheduling group resources during trunking communication according to various embodiments.

FIG. 1 is a flowchart illustrating a method for scheduling group resources during trunking communication according to various embodiments.

As shown in FIG. 1, the method includes the following.

At block 101, base stations connected to a trunking switch center are classified into at least one co frequency base station set and/or are marked as different frequency base stations according to central frequencies and home regions of the base stations.

At block 102, when a group call is established, the same trunking shared channel is allocated and the same packet delivery time is designated to base stations in one co frequency base station set, and each base station in the co frequency base station set is notified of the trunking shared channel and the packet delivery time.

At block 103, the base stations in the co frequency base station set start to send trunking packets on the trunking shared channel at the packet delivery time.

Various embodiments of the present disclosure will be illustrated hereinafter in detail. Network entities in the embodiments include base stations in a trunking system and a trunking switch center.

A first embodiment is described as follows.

In this embodiment, it is the trunking switch center that classifies base stations into at least one co frequency base station set or marks the base stations as different frequency base stations. When a group call is established, a process of allocating the same trunking shared channel and designating the same packet delivery time to base stations in a co frequency base station set includes the following.

At step (I), when the trunking switch center is turned on or restarted, the trunking switch center classifies the base stations connected to it according to the central frequencies and home regions of the base stations, and adds base stations having the same central frequency and home region into the same co frequency base station set. If the central frequency or the home region of a base station is different from the central frequencies or home regions of other base stations, the base station is marked as a different frequency base station. If a base station is newly connected to the trunking switch center, the base station may send a request to trigger the trunking switch center to add it into a co frequency base station set or mark it as a different frequency base station.

For example, the trunking switch center is connected with a base station 1, a base station 2, a base station 3, a base station 4, a base station 5 and a base station 6. Suppose the central frequency of the base station 1 is 1800 MHz and the home region of the base station 1 is a, the central frequency of the base station 2 is 1800 MHz and the home region of the base station 2 is b, the central frequency of the base station 3 is 1600 MHz and the home region of the base station 3 is a, the central frequency of the base station 4 is 1800 MHz and the home region of the base station 4 is a, the central frequency of the base station 5 is 1800 MHz and the home region of the base station 5 is b, the central frequency of the base station 6 is 1800 MHz and the home region of the base station 6 is c. Accordingly, the base station 1 and the base station 4 belong to a co frequency base station set 1, the base station 2 and the base station 5 belong to a co frequency base station set 2, the base station 3 is a different frequency base station 1, and the base station 6 is a different frequency base station 2.

At step (II), when the group call is established, the trunking switch center allocates the same trunking shared channel and designates the same packet delivery time to base stations in the same co frequency base station set, and sends to the base stations a group call establishing request containing the allocated trunking shared channel and the designated packet delivery time. It is unnecessary to allocate a trunking shared channel and to designate packet delivery time to a different frequency base station, but only a group call establishing request is sent to the different frequency base station when the group call is established.

Based on the description in the step (I), the trunking switch center allocates a trunking shared channel 1 and designates packet delivery time 1 to the co frequency base station set 1, and allocates a trunking shared channel 2 and designates packet delivery time 2 to the different frequency base station set 2. When the group call is established, the trunking switch center sends to the base station 1 and the base station 4 a group call establishing request containing the trunking shared channel 1 and the packet delivery time 1, sends to the base station 2 and the base station 5 a group call establishing request containing the trunking shared channel 2 and the packet delivery time 2, and sends to the base station 3 and the base station 6 a group call establishing request that does not contain a trunking shared channel and packet delivery time.

At step (III), after receiving the group call establishing request sent by the trunking switch center, the base stations in the co frequency base station set start to send trunking packets on the same trunking shared channel at the same packet delivery time. After receiving the group call establishing request sent by the trunking switch center, the different frequency base station dynamically allocates a trunking shared channel and sends trunking packets on the trunking shared channel.

Based on the description in the step (II), after receiving the group call establishing request, the base station 1 and the base station 4 start to send trunking packets on the trunking shared channel 1 at the packet delivery time 1, the base station 2 and the base station 5 start to send trunking packets on the trunking shared channel 2 at the packet delivery time 2, and the base station 3 and the base station 6 dynamically allocate a trunking shared channel respectively, and send trunking packets on the respectively allocated trunking shared channel.

A second embodiment is described as follows.

In this embodiment, after classifying the base stations into at least one co frequency base station set, the trunking switch center sets the same trunking shared channel to be reserved by the base stations in a co frequency base station set according to the set number of trunking shared channels to be reserved by the co frequency base station set. When the group call is established, the trunking switch center designates the same packet delivery time to the base stations in the co frequency base station set. The second embodiment includes the follows.

The step (I) is the same as that in the first embodiment.

At step (II), the trunking switch center sets trunking shared channel to be reserved by each co frequency base station set, and notifies base stations in each co frequency base station set to reserve the set trunking shared channel and required power resources.

The trunking switch center may set the number of trunking shared channels to be reserved by the co frequency base station set. If members in a co frequency base station set changes, for example, a base station adds into or quits from the co frequency base station set, the trunking switch center may reset the number of trunking shared channels to be reserved by the co frequency base station set. For example, the trunking switch center sets the number of trunking shared channels to be reserved by the co frequency base station set 1 as 3, and sets the number of trunking shared channels to be reserved by the co frequency base station set 2 as 2. Accordingly, the trunking switch center may set the trunking shared channels 1, 2 and 5 to be reserved by the co frequency base station set 1, and set the trunking shared channels 3 and 4 to be reserved by the co frequency base station set 2. The trunking switch center notifies the base stations 1 and 4 to reserve the trunking shared channels 1, 2 and 5 and corresponding power resources, and notifies the base stations 2 and 5 to reserve the trunking shared channels 3 and 4 and corresponding power resources.

At step (III), when the group call is established, the trunking switch center selects a group of reserved trunking shared channels for base stations in the same co frequency base station set, designates the same packet delivery time, and sends to the base stations a group call establishing request containing the selected trunking shared channels and the designated packet delivery time. It is unnecessary to allocate a shared channel and designate packet delivery time to the different frequency base station, but the group call establishing request is sent to the different frequency base station when the group call is established. For example, the trunking switch center selects the trunking shared channel 1 for the base stations in the co frequency base station set 1 and designates the packet delivery time 1, and selects the trunking shared channel 3 for the base stations in the co frequency base station set 2 and designates the packet delivery time 2. When the group call is established, the trunking switch center sends to the base stations 1 and 4 a group call establishing request containing the trunking shared channel 1 and the packet delivery time 1, sends to the base stations 2 and 5 a group call establishing request containing the trunking shared channel 3 and the packet delivery time 2, and sends to the base stations 3 and 6 a group call establishing request that does not contain a trunking shared channel and packet delivery time.

At step (IV), after receiving the group call establishing request sent by the trunking switch center, the base stations in the co frequency base station set star to send trunking packets on the same trunking shared channel at the same packet delivery time. After receiving the group call establishing request sent by the trunking switch center, the different frequency base station dynamically allocates a trunking shared channel and sends trunking packets on the allocated trunking shared channel.

After receiving the group call establishing request, the base stations 1 and 4 start to send trunking packets on the trunking shared channel 1 at the packet delivery time 1, the base stations 2 and 5 start to send trunking packets on the trunking shared channel 3 at the packet delivery time 2, and the base stations 3 and 6 dynamically allocate a trunking shared channel respectively and send trunking packets on the respectively allocated trunking shared channel.

At step (V), after the establishment of the group call occupied the trunking shared channel reserved by the co frequency base station set, the trunking switch center continues to set trunking shared channels to be reserved by the co frequency base station set until the number of the set trunking shared channels to be reserved by the co frequency base station set is satisfied or the co frequency base station set has no remained channel resources.

Based on the description in the step (III), the number of trunking shared channels to be reserved by the co frequency base station set 1 is 3, and the number of trunking shared channels to be reserved by the co frequency base station set 2 is 2. After the establishment of the group call occupied the trunking shared channels 1 and 3, the trunking switch center continues to set a trunking shared channel 6 to be reserved by the co frequency base station set 1, and notifies the base stations 1 and 4 to reserve the trunking shared channel 6 and corresponding power resources, so as to make the number of the reserved trunking shared channels equal to the set number 3. At this time, no remained channel resources may be reserved, and thus no channel resources are reserved by the co frequency base station set 2.

At step (VI), when the group call is released, if the trunking switch center determines that the number of the trunking shared channels reserved by the co frequency base station set is smaller than the set number, the trunking switch center sets the released trunking shared channels as trunking shared channels to be reserved by the co frequency base station set. Otherwise, the trunking shared channels occupied by the group call are released.

Based on the description in the step (V), when the group call is released, if the trunking switch center determines that the reserved trunking shared channels that are remained by the co frequency base station set 1 are trunking shared channels 2, 5 and 6, the trunking switch center releases the trunking shared channel 1 occupied by the group call. If the reserved trunking shared channel that is remained by the co frequency base station set 2 is the trunking shared channel 4 and thus the number of the reserved trunking shared channels that are remained is smaller than 2, the trunking switch center sets the trunking shared channel 2 occupied by the group call as the trunking shared channel to be reserved by the co frequency base station set 2 after the group call is released.

A third embodiment is described as follows.

In this embodiment, after classifying the base stations into at least one co frequency base station set, the trunking switch center reserves the same trunking shared channels for the base stations in a co frequency base station set according to the set maximum number and the minimum number of trunking shared channels to be reserved for the co frequency base station set. When the group call is established, the same packet delivery time is designated to the base stations in the co frequency base station set. The third embodiment includes the following.

The step (I) is the same as that in the above embodiments.

The step (II) is the same as that in the second embodiment. Besides, the trunking switch center also sets the maximum number and the minimum number of trunking shared channels to be reserved for the co frequency base station set. For example, the trunking switch center sets the maximum number of trunking shared channels to be reserved by the co frequency base station set 1 is 3, sets the minimum number of trunking shared channels to be reserved by the co frequency base station set 1 is 1, sets the maximum number of trunking shared channels to be reserved by the co frequency base station set 2 is 2 and sets the minimum number of trunking shared channels to be reserved by the co frequency base station set 2 is 1. Accordingly, the trunking switch center sets trunking shared channels 1, 2 and 5 to be reserved by the co frequency base station set 1, sets trunking shared channels 3 and 4 to be reserved by the co frequency base station set 2, notifies the base stations 1 and 4 to reserve the trunking shared channels 1, 2 and 5 and corresponding power resources, and notifies the base stations 2 and 5 to reserve the trunking shared channels 3 and 4 and corresponding power resources.

The steps (III) and (IV) are the same as those in the second embodiment.

At step (V), after the establishment of the group call occupied the trunking shared channel reserved by the co frequency base station set, if the trunking switch center determines that the number of the reserved trunking shared channels that are remained by the co frequency base station set is smaller than the minimum number, the trunking switch center continues to set trunking shared channels to be reserved by the co frequency base station set until the number of the reserved trunking shared channels is equal to the minimum number, except the co frequency base station set has no remained channel resources.

In this embodiment, the minimum number of trunking shared channels to be reserved by the co frequency base station set 1 and the minimum number of trunking shared channels to be reserved by the co frequency base station set 2 are both set as 1 by the trunking switch center. If the trunking switch center determines that the reserved trunking shared channels that are remained by the co frequency base station set 1 are the trunking shared channels 2 and 5 and thus the number of the reserved trunking shared channels that are remained is larger than 1, the trunking switch center does not perform a reservation operation for the co frequency base station set 1. The reserved trunking shared channel that is remained by the co frequency base station set 2 is the trunking shared channel 4 and thus the number of the reserved trunking shared channels that are remained is 1, the trunking switch center does not perform a reservation operation for the co frequency base station set 2.

At step (VI), when the group call is released, if the trunking switch center determines that the number of the trunking shared channels reserved by the co frequency base station set is smaller than the minimum number, the trunking switch center sets the released trunking shared channels to be reserved by the co frequency base station set. Otherwise, the trunking switch center releases the trunking shared channels occupied by the group call.

When the trunking switch center determines that the reserved trunking shared channels that are remained by the co frequency base station set 1 are the trunking shared channels 2 and 5 and thus the number of the reserved trunking shared channels that are remained is larger than 1, the trunking switch center releases the trunking shared channel 1. The reserved trunking shared channel that is remained by the co frequency base station set 2 is the trunking shared channel 4 and thus the number of the reserved trunking shared channels that are remained is 1, the trunking switch center releases the trunking shared channel 2 when the group call is released.

By the method described in the above embodiments, when a trunking group is established, it is unnecessary to perform avoidance between adjacent co frequency base stations in which members in the trunking group are distributed to avoid co frequency interference, thereby improving the efficiency of channel resources of trunking system and improving the group capacity of trunking system.

Based on the above embodiments, a system for scheduling group resources during trunking communication is provided according to various embodiments.

Figure 2:
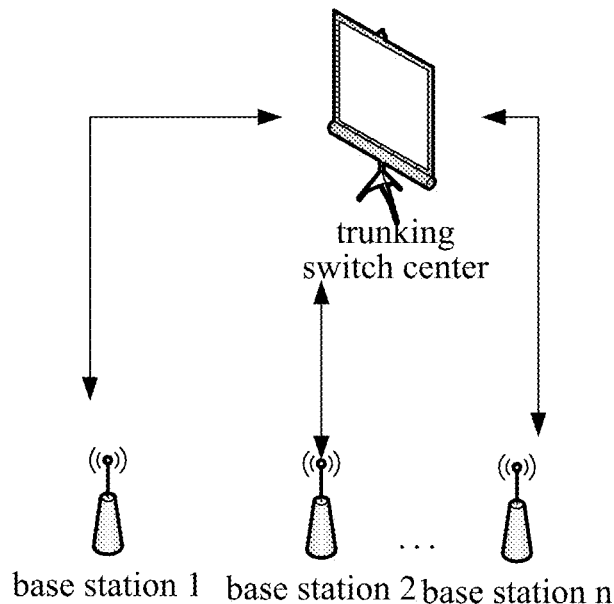
FIG. 2 is a diagram illustrating the structure of a system for scheduling group resources during trunking communication according to various embodiments.

FIG. 2 is a diagram illustrating the structure of a system for scheduling group resources during trunking communication according to various embodiments.

As shown in FIG. 2, the system includes a trunking switch center and base stations connected to the trunking switch center. There is a plurality of base stations, for example, there are at least two base stations.

The trunking switch center is configured to classify the base stations into at least one co frequency base station set and/or mark the base stations as different frequency base stations according to central frequencies and home regions of the base stations. When a group call is established, the trunking switch center is configured to allocate the same trunking shared channel and designate the same packet delivery time to base stations in one co frequency base station set, and notify each base station in the co frequency base station set of the allocated trunking shared channel and the designated packet delivery time.

The base stations in the co frequency base station set are configured to start to send trunking packets on the allocated trunking shared channel at the designated packet delivery time.

In an embodiment, the trunking switch center sets trunking shared channels to be reserved by each co frequency base station set, and notifies base stations in each co frequency base station set to reserve the set trunking shared channels and required power resources.

In an embodiment, the trunking switch center is further configured to, when the group call is released, determine whether the number of the trunking shared channels reserved by the co frequency base station set is smaller than a set number, set the released trunking shared channels as trunking shared channels to be reserved by the co frequency base station set when determining that the number of the trunking shared channels reserved by the co frequency base station set is smaller than the set number, and release the trunking shared channels occupied by the group call when determining that the number of the trunking shared channels reserved by the co frequency base station set is not smaller than the set number.

The foregoing is only preferred embodiments of the present invention, and the protection scope of the present invention is not limited to this. Any improvement and replacement which can be made in the technical scope disclosed by the present invention by those skilled in the art should be covered in the protection scope of the invention. And thus, the protection scope of the present invention should be defined by the claims.

What is claimed is:

1. A method for scheduling group resources during trunking communication, comprising:
    classifying base stations connected to a trunking switch center into at least one co frequency base station set and marking a base station that cannot be classified into the at least one co frequency base station set as a different frequency base station according to central frequencies and home regions of the base stations;
    when a group call is established, allocating the same trunking shared channel and designating the same packet delivery time to base stations in one co frequency base station set, and notifying each base station in the co frequency base station set of the trunking shared channel and the packet delivery time; and
    the base stations in the co frequency base station set starting to send trunking packets on the trunking shared channel at the packet delivery time.

2. The method of claim 1, wherein notifying each base station in the co frequency base station set of the trunking shared channel and the packet delivery time comprises:
    sending to each base station in the co frequency base station set a group call establishing request containing the trunking shared channel and the packet delivery time.

3. The method of claim 1, further comprising:
    when the group call is established, sending to the different frequency base station a group call establishing request that does not contain a trunking shared channel and packet delivery time, and the different frequency base station allocating a trunking shared channel by itself and sending trunking packets on the allocated trunking channel.

4. The method of claim 1, wherein classifying the base stations connected to the trunking switch center into at least one co frequency base station set and marking the base station as the different frequency base station according to the central frequencies and home regions of the base stations comprises:
    classifying base stations having the same central frequency and home region into one co frequency base station set, and marking the base station as the different frequency base station if central frequency or home region of the base station is different from central frequencies or home regions of other base stations.

5. The method of claim 1, further comprising:
setting a trunking shared channel to be reserved by each co frequency base station set, and notifying base stations in each co frequency base station set to reserve the set trunking shared channel and required power resources.

6. The method of claim 5, wherein allocating the same trunking shared channel and designating the same packet delivery time to the base stations in one co frequency base station set, and notifying each base station in the co frequency base station set of the trunking shared channel and the packet delivery time comprises:
when the group call is established, selecting one group of reserved trunking shared channels for base stations in each co frequency base station set, designating the same packet delivery time, and notifying the base stations in each co frequency base station set of the selected trunking shared channels and the designated packet delivery time.

7. The method of claim 5, further comprising:
setting the number of trunking shared channels to be reserved by each co frequency base station set.

8. The method of claim 7, further comprising:
after the establishment of the group call occupied the reserved trunking shared channel, continuing to set a trunking shared channel to be reserved by each co frequency base station set until the number of the set trunking shared channels is equal to a set number or the co frequency base station set has no remained channel resources.

9. The method of claim 7, further comprising:
when the group call is released, determining whether the number of the trunking shared channels reserved by the co frequency base station set is smaller than a set number; if yes, setting a released trunking shared channel as a trunking shared channel to be reserved by the co frequency base station set; if no, releasing the trunking shared channel occupied by the group call.

10. The method of claim 7, wherein the number of trunking shared channels to be reserved by each co frequency base station set comprises a maximum number and a minimum number, and the trunking shared channels to be reserved by the co frequency base station set is set according to the maximum number.

11. The method of claim 10, further comprising:
after the establishment of the group call occupied the trunking shared channel reserved by the co frequency base station set, determining whether the number of trunking shared channels remained by the co frequency base station set is smaller than the minimum number; if yes, continuing to set trunking shared channels to be reserved by the co frequency base station set until the number of the set trunking shared channels is equal to the minimum number or the co frequency base station set has no remained channel resources.

12. The method of claim 10, further comprising:
when the group call is released, determining whether the number of the trunking shared channels reserved by the co frequency base station set is smaller than the minimum number; if yes, setting a released trunking shared channel as a trunking shared channel to be reserved by the co frequency base station set; if no, releasing the trunking shared channel occupied by the group call.

13. A system for scheduling group resources during trunking communication, comprising a trunking switch center and base stations connected to the trunking switch center,
the trunking switch center is configured to classify the base stations into at least one co frequency base station set and mark a base station that cannot be classified into the at least one co frequency base station set as a different frequency base station according to central frequencies and home regions of the base stations; when a group call is established, to allocate the same trunking shared channel and designate the same packet delivery time to base stations in one co frequency base station set, and notify each base station in the co frequency base station set of the allocated trunking shared channel and the designated packet delivery time; and
the base stations in the co frequency base station set are configured to start to send trunking packets on the allocated trunking shared channel at the designated packet delivery time.

14. The system of claim 13, wherein the trunking switch center is further configured to set trunking shared channels to be reserved by each co frequency base station set, and notify base stations in each co frequency base station set to reserve the set trunking shared channels and required power resources.

15. The system of claim 13, wherein the trunking switch center is further configured to, when the group call is released, determine whether the number of the trunking shared channels reserved by the co frequency base station set is smaller than a set number, set the released trunking shared channels as trunking shared channels to be reserved by the co frequency base station set when determining that the number of the trunking shared channels reserved by the co frequency base station set is smaller than the set number, and release the trunking shared channels occupied by the group call when determining that the number of the trunking shared channels reserved by the co frequency base station set is not smaller than the set number.

16. The method of claim 8, further comprising:
when the group call is released, determining whether the number of the trunking shared channels reserved by the co frequency base station set is smaller than a set number; if yes, setting a released trunking shared channel as a trunking shared channel to be reserved by the co frequency base station set; if no, releasing the trunking shared channel occupied by the group call.

17. The method of claim 11, further comprising:
when the group call is released, determining whether the number of the trunking shared channels reserved by the co frequency base station set is smaller than the minimum; if yes, setting a released trunking shared channel as a trunking shared channel to be reserved by the co frequency base station set; if no, releasing the trunking shared channel occupied by the group call.

* * * * *